(12) United States Patent
Lee et al.

(10) Patent No.: US 9,026,619 B2
(45) Date of Patent: May 5, 2015

(54) SYSTEM AND METHOD AUTOMATICALLY OF PERSONALIZED MEDIA DEVICE SELECTION AND DATA MANAGEMENT IN SMART MEDIA CLOUD ENVIRONMENT

(75) Inventors: Han-ku Lee, Seoul (KR); Hyo-Gun Yoon, Daejeon (KR); Myoung-Jin Kim, Dongducheon (KR); Yun Cui, Seoul (KR)

(73) Assignee: Konkuk University Industrial Cooperation Corp., Seoul (KR)

( * ) Notice: Subject to any disclaimer, the term of this patent is extended or adjusted under 35 U.S.C. 154(b) by 709 days.

(21) Appl. No.: 13/337,448

(22) Filed: Dec. 27, 2011

(65) Prior Publication Data

US 2013/0145048 A1 Jun. 6, 2013

(30) Foreign Application Priority Data

Dec. 5, 2011 (KR) ........................ 10-2011-0129249

(51) Int. Cl.
*G06F 15/16* (2006.01)
*H04L 12/28* (2006.01)

(52) U.S. Cl.
CPC ..... *H04L 12/2836* (2013.01); *H04L 2012/2849* (2013.01)

(58) Field of Classification Search
CPC ............ H04L 12/2803; H04L 12/2836; H04L 65/4069; H04L 65/4084
USPC ................................................ 709/219, 246
See application file for complete search history.

(56) References Cited

U.S. PATENT DOCUMENTS

| | | | |
|---|---|---|---|
| 2008/0189617 A1* | 8/2008 | Covell et al. ................... | 715/738 |
| 2009/0094317 A1* | 4/2009 | Venkitaraman ............... | 709/203 |
| 2011/0161409 A1* | 6/2011 | Nair et al. ...................... | 709/203 |
| 2012/0151006 A1* | 6/2012 | McInerney et al. ........... | 709/219 |
| 2012/0221662 A1* | 8/2012 | Yasukawa et al. ............ | 709/206 |

OTHER PUBLICATIONS

Yun Cui et al, Design and Implementation of Social Media Sharing System Model Using UPnP Technology based on Cloud Media, International Conference on Computer Convergence Technology, Oct. 2011, Department of internet&Multimedia Engineering, Konkuk University, Seoul, Korea.

* cited by examiner

*Primary Examiner* — Jason Recek
(74) *Attorney, Agent, or Firm* — Lexyoume IP Meister, PLLC

(57) ABSTRACT

The disclosure relates to a system, and a method, for automatically selecting a personal media apparatus and managing data under a smart media cloud environment. Specifically, the system, and the method, for automatically selecting a personal media apparatus and managing data under a smart media cloud environment, provide functions of determining the degree of control of a device and the automatic conversion of media service between a smart media contents and a cloud media contents under a private network environment by automatically selecting and controlling, in accordance with a media contents, a variety of output device under UPnP and DLNA environments, and under the structure of converting a cloud media streaming data with a media renderer connected in a smart device.

6 Claims, 6 Drawing Sheets

SYSTEM AND METHOD AUTOMATICALLY OF PERSONALIZED MEDIA DEVICE SELECTION AND DATA MANAGEMENT IN SMART MEDIA CLOUD ENVIRONMENT

CROSS-REFERENCE TO RELATED APPLICATION

This application claims priority to Korean Patent Application No. 10-2011-0129249, filed on Dec. 5, 2011, and all the benefits accruing therefrom under 35 U.S.C. §119, the contents of which in its entirety are herein incorporated by reference.

BACKGROUND

1. Field

This disclosure relates to a method, and a system thereof, for automatically selecting a personal media device and managing data under a smart media cloud environment. Specifically, the method, and the system, for automatically selecting a personal media device and managing data under a smart media cloud environment, are suggested to automatically select, and control, a variety of media output devices in accordance with media contents under an UPnP and DLNA environment, thereby providing the functions of an automated media service conversion between smart media contents and cloud media contents in a private network environment, and of a determination of the degree of control of devices.

2. Description of the Related Art

Devices for outputting media contents in such a private network as home network generally include Universal Plug and Play (UPnP) and Digital Living Network Alliance (DLNA) technologies. These technologies are designed to provide standardized media contents anywhere at any time when connected to the Internet because they support an intelligent home automation solution for personal users. The UPnP technology provides a distributed, open networking architecture, which not only affects TCP/IP and web technologies but also provides data transfer and control between devices connected in a network, in order to furnish a seamless proximity networking. The DLNA provides an architecture designed to implement conversions among electronic device vendors, and establish a compatible platform on the basis of the public industry standard that has already been established for use of home network.

The UPnP Device Architecture (UDA) provides a zero-configuration and invisible networking, and a categorization of media devices within a certain boundary by means of automatic search from devices made by a variety of electronic device vendors. In this architecture, media devices are dynamically connected in a private network. The architecture obtains a private IP address from a device to transmit its capacities, and provides information of the existence and capacities of other devices in the network.

A home network environment built on such UPnP and DLNA allows an automatic search of different media devices among media devices, smart media devices, and cloud media systems, which are connected in a home network for the purpose of sharing contents between devices in a deck. As individual media services have metadata information of media files, music files, or image files, a profile management technology is applicable to obtain such information, generate a MIME type necessary for service connection, and store in the DB of a smart device the metadata of all relevant media contents.

Furthermore, the guideline of UPnP and DLNA provides a principle of design by which sharing of media contents is allowed between products with different brands via a wired or wireless network between home appliances, PCs, and smart devices. Therefore, the products in compliance with this guideline may share each other media contents such as music, photographs, or videos through a wired or wireless home network. Upon sharing media contents between devices, which are used in a home network environment built on UPnP and DLNA, services are controlled in consideration of the characteristics of devices and communication environments, and a connection to a variety of servers on a private communication network is made to provide better quality service.

However, under the current home network environment, users should bother to manipulate each UPnP or DLNA device to play each of media contents, for example when they want to play music contents with an audio-playable device while an image contents is being played by an UPnP or DLNA device such as a digital photo frame in which image files like photographs are operable. Moreover, with respect to controlling of peripheral appliances while watching a movie, users should inconveniently operate each DLNA device, for example, in order to pause the operation of a motor-operated appliance such as a vacuum or washing machine or to shift it to a low noise mode, and to adjust the brightness of lighting appliances, while the users consume such contents as movies through a DLNA device such as a television. Because, within a deck, a variety of user interfaces (UIs) are to be used to operate each DLNA device in order to consumemedia contents, there is no way to play media contents in a synchronized way in each DLNA device.

A cloud media system may replace the functions of a prior UPnP media server or DLNA home server, and so operate as to maintain media contents data and home network including a virtual network connected to the Internet, and to convert the media data into one suitable to a service environment in a distributed environment.

Furthermore, the system has an architecture that replaces the functions of an user's PC with virtualized functions necessary for services, and may thus provide media contents services suitable to a service environment in a variety of home service devices and smart media appliances. Also, it provides functions including the interaction between sharing and distributing of media contents in accordance with a service environment.

Accordingly, this field of technology has demanded a technology which conveniently provides the management of a variety of devices in a home network connected to a cloud media system by means of expanding the function of home network built on DLNA and the search of a media output device via UPnP, and also provides the synchronization and automatic search in order to play contents suitable to a device among a plurality of contents.

SUMMARY

For the purpose of improving the problems as mentioned above, the present disclosure provides a technique and method for automatically selecting a media output device suitable for a service environment of a user's media contents, for managing data and modules by which a contents data stream necessary a service is converted from a cloud media system, and for synchronizing three objects, i.e., a cloud media system, a UPnP and DLNA media output device, and a smart device.

To achieve the objectives mentioned above, a system for automatically selecting a personal media device and managing data under a smart media cloud environment according to the present invention preferably includes: a service agent part for performing matching suitable for each type of information to synchronize a smart device with a media output device; a service requesting part for parsing a XML document of multimedia data included in said smart device and said media output device, and requesting a service of a media cloud system in accordance with a service signal; an event controlling part for controlling multimedia services by synchronizing each of said media output device and said smart device in accordance with said service request; and a media data receiving part for receiving media data provided from said smart media cloud system, and a personal multimedia service may preferably be synchronized to be provided under a customized multimedia smart service environment using UPnP and DLNA.

The service agent part may preferably includes: a service management module for managing a media contents output from a smart device; a service meta definition module for parsing meta data in a certain form from the media contents information in use; a device recognition module for recognizing and categorizing signals received from the media play device; a device definition module for constituting the difference between the information of devices output from UPnP and DLNA in a same form; a key match module for analyzing the key value by elements necessary for play from the defined service meta and device meta information, arranging devices having a value above a certain form, and suggesting the information of the highest media play device; a connectivity reinforcement module for increasing the connectivity of devices by giving a weight to service in order to maintain services of the media play device and the contents, which have been matched by said key; a selection recommendation module for recommending such connected media play device first to an user, and to an interface so rearranged as to be suitable for the user's service structure; and a signal reinforcement module for strengthening media stream signals to safely output the media service received from the cloud media system to said recommended media play device.

The event controlling part, which allows said smart device to be used as a controlling instrument or a media output apparatus, includes: an event control signal generating module for identifying an event content from the event definition module in which a service control structure is pre-determined within said user's interface, and generating the event signal with respect to the event content; a device matching information call module for identifying the device matching information matched from said service agent part, and extracting a key value from the generated event control signal; an event key management module for managing the event key and the matching key in a certain form; a matching key management module for so controlling as to manage and store said matching key; a matching key management module; an event DB for storing and managing said keys for a certain period of time; and a device DB. The part has a structure for transmitting safely an event of service and controlling the service, by further including a service control signal generating module for generating a service control event signal, which controls the output of media contents and devices by means of such connected keys; and an event control signal transmission module for safely transmitting the generated control signal to the cloud media system.

The service requesting part, which is to request a cloud media system for a service in a smart device with said user's service information retained, includes: a network connectivity examination module for testing a network environment to continuously maintain the connection of network in a synchronization of media contents; a protocol definition module for transmitting a requesting signal to a cloud media system to request a service through said connected network; a protocol requesting module for requesting a media play device information, a service control signal, and an user information, which are required to constitute a service requesting protocol; a device meta normalization module for enciphering and normalizing each of the requested information in accordance with the type of protocol; an event control signal normalization module for synchronizing service signals and controls; an user certification module for securing user's certification information from an user profile to protect a cloud media system and the safety of service; and a protocol unification/compression module for quickly and reliably transmitting such aggregated information to the cloud media system.

The media data receiving part for safely receiving the media contents information of a cloud media system requested at said smart device includes: a media data recognition module for recognizing a media stream information received from a cloud media system; a protocol normalization module for outputting the recognized media data to a media play device or smart device; a media meta parsing module for extracting media contents information to manage the type of the received media stream data; a media library call module for outputting the received media contents; a media meta management module for unifying and managing the parsed media data and library; and a media management DB for storing and managing said information in a certain form.

The media service interface for automatically converting the interface display of said smart device includes: a service separation module for analyzing and separating the types of service contents in the parsed media meta information; a service interface manipulation module for constituting interfaces controlling said separated service contents; an event definition module for connecting media contents with interface for controlling in accordance with the type of said service contents; and an event controlling part for generating and controlling an event by an user's touching motion.

Furthermore, the invention comprises the steps of matching in accordance with each type of information in order to synchronize an output device with a smart device through a service agent part; parsing a XML document of a multimedia data included in said smart device and said media output device through a service requesting part, and requesting a service of a smart media cloud system in accordance with a service signal; controlling a multimedia service by synchronizing each of said media output device and said smart device in accordance with said service request through an event controlling part; and receiving a media data provided from said smart media cloud system through a media data receiving part.

According to the present invention, every kind of electronic devices may be swiftly accessed and controlled in a service environment of individual users because the best media environment is suggested and managed by means of an automatic connection, in a smart device, to a multimedia output device of a home network consisting of UPnP and DNLA, in accordance with contents situations.

Moreover, when a media output device cannot find or search a device suitable for the type of contents, it may provide a service synchronization by changing it to the type of contents suitable to the environment of a media output device through a cloud media system.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
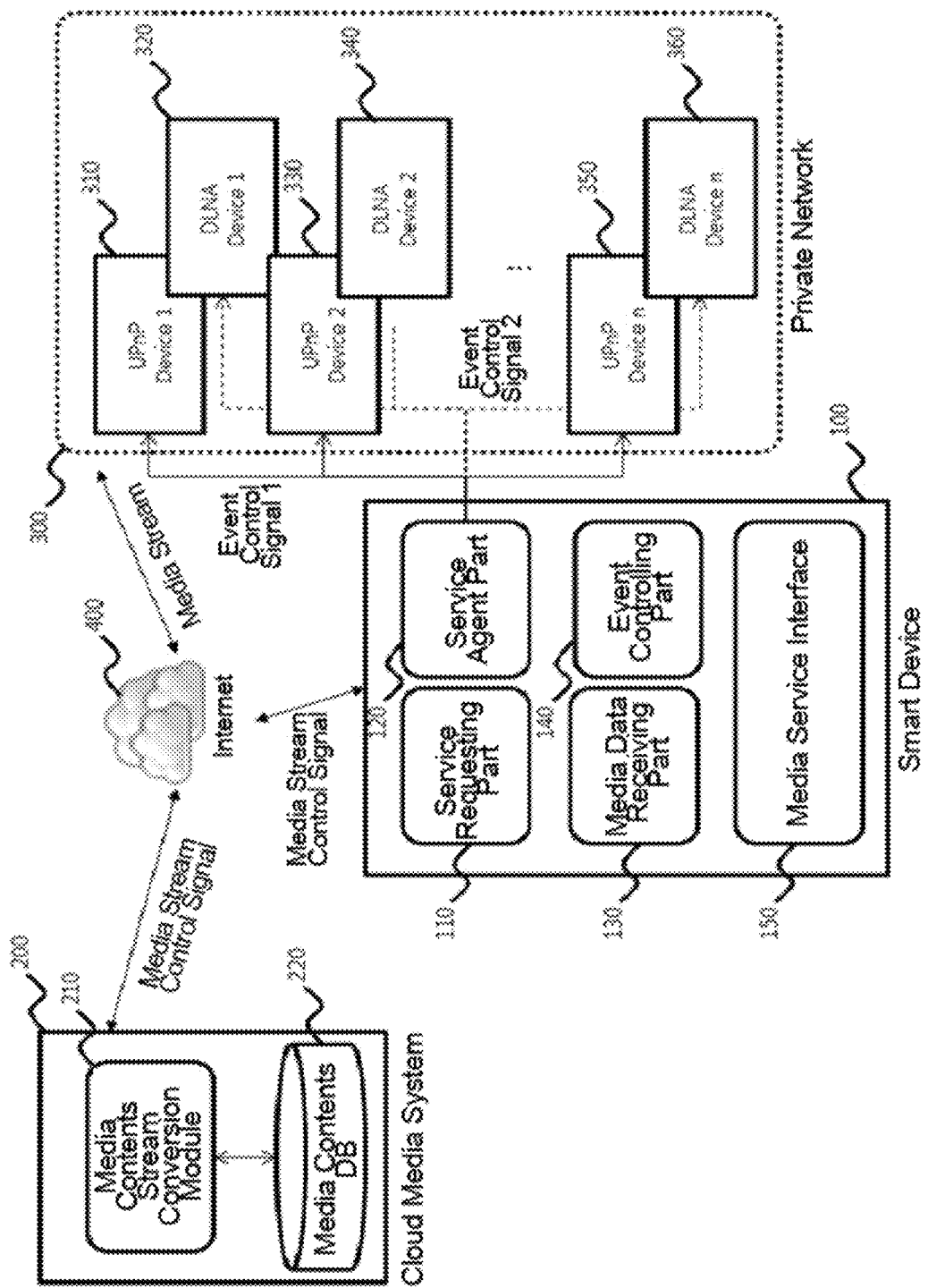
FIG. 1 is a block diagram generally illustrating the flow of service with respect to a method for managing data and automatically selecting a personal media device in a smart media cloud environment, according to an embodiment herein.
Figure 2:
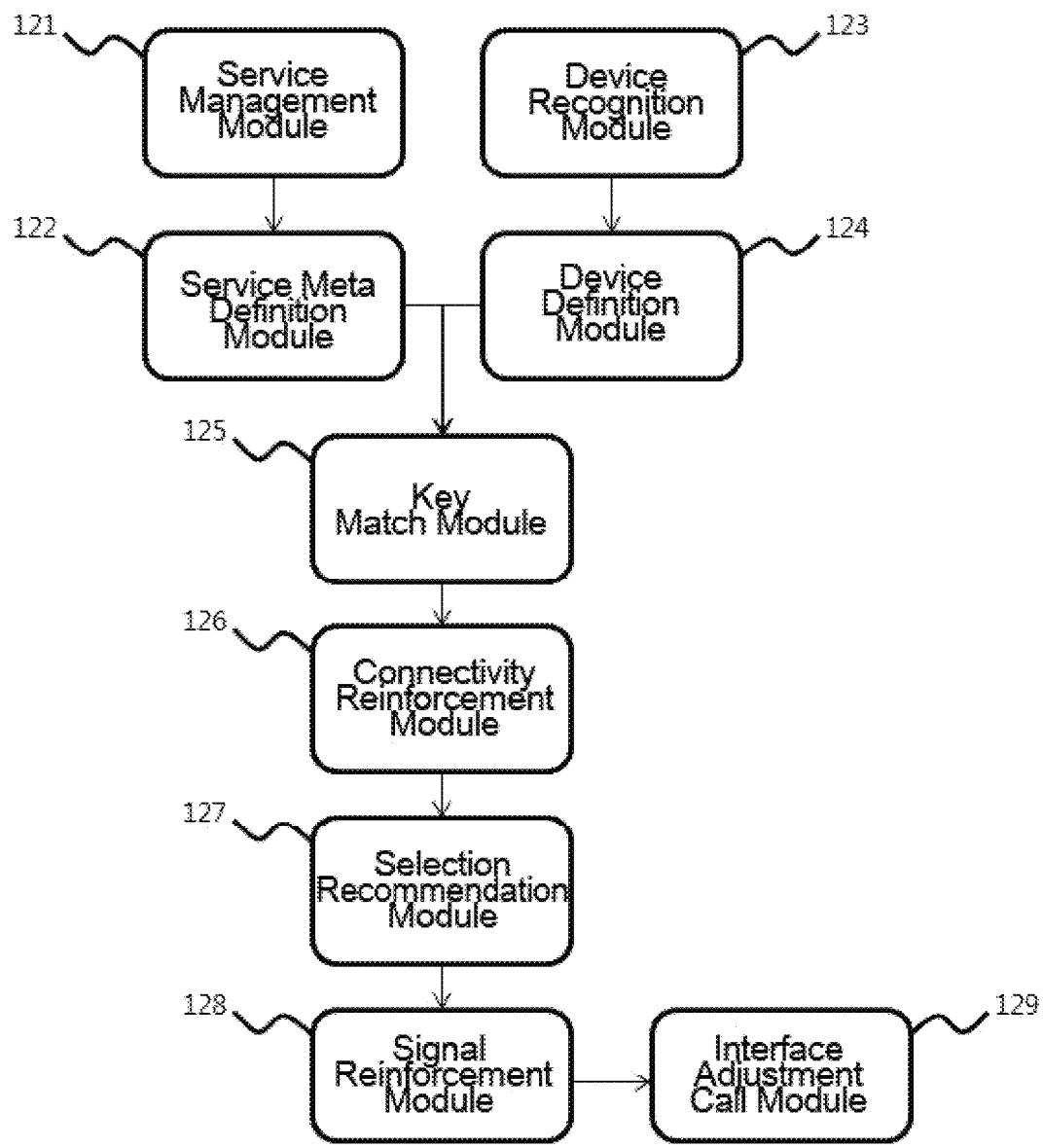
FIG. 2 is a block diagram specifically illustrating an automatic match of UPnP and DLNA media play devices of a service agent part in the smart device depicted in FIG. 1.
Figure 3:
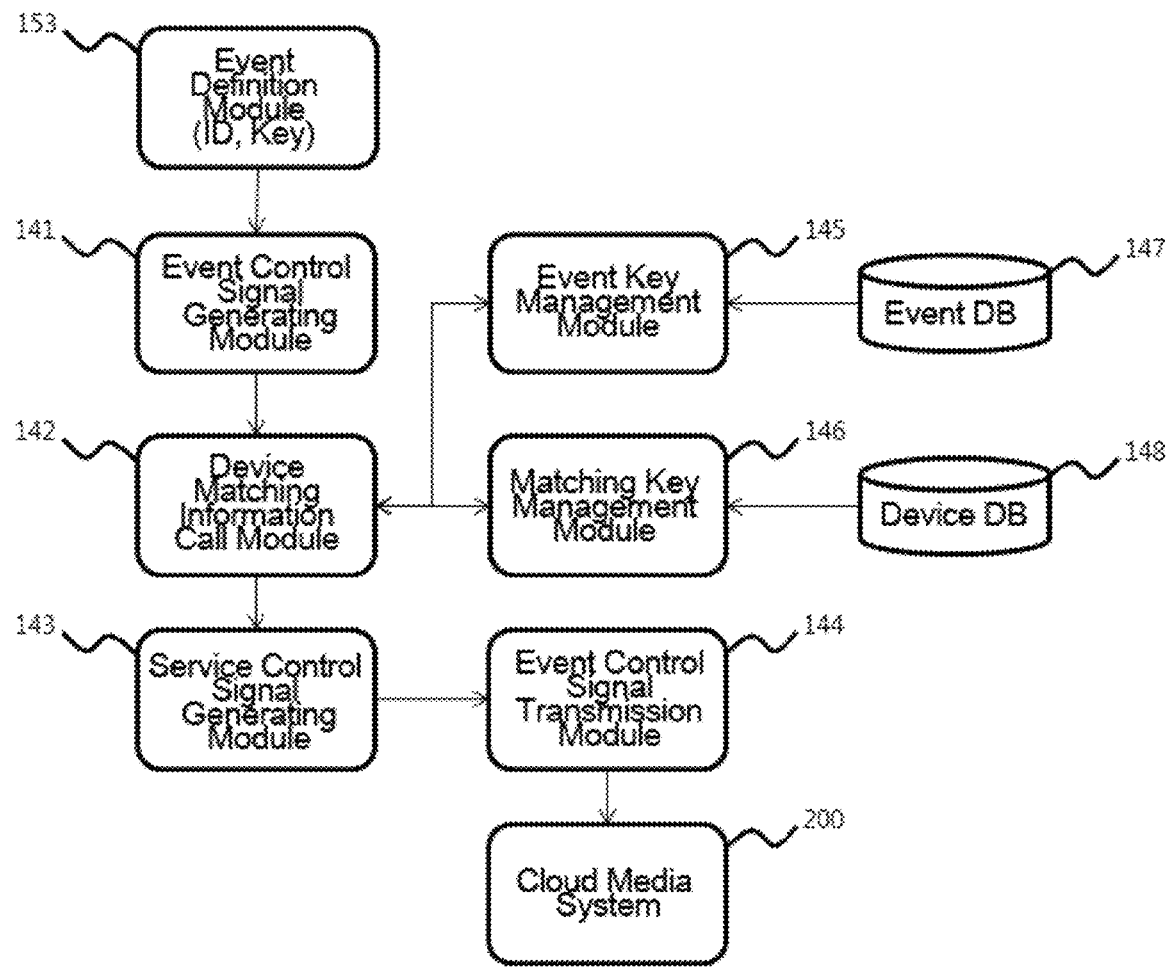
FIG. 3 is a block diagram specifically illustrating an event controlling part for controlling the UPnP and DLNA media play devices in the smart device depicted in FIG. 1.
Figure 4:
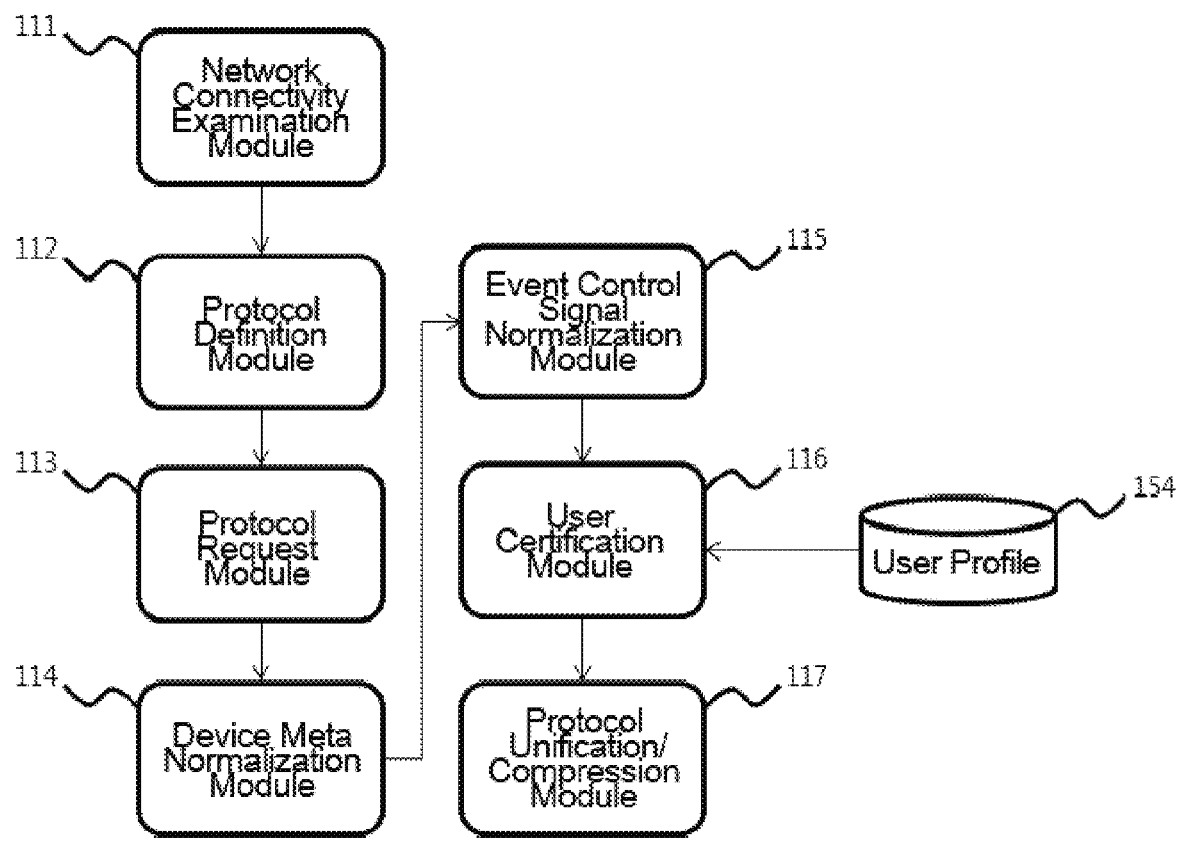
FIG. 4 is a block diagram specifically illustrating a service requesting part for use of personal media contents services in the smart device depicted in FIG. 1.
Figure 5:
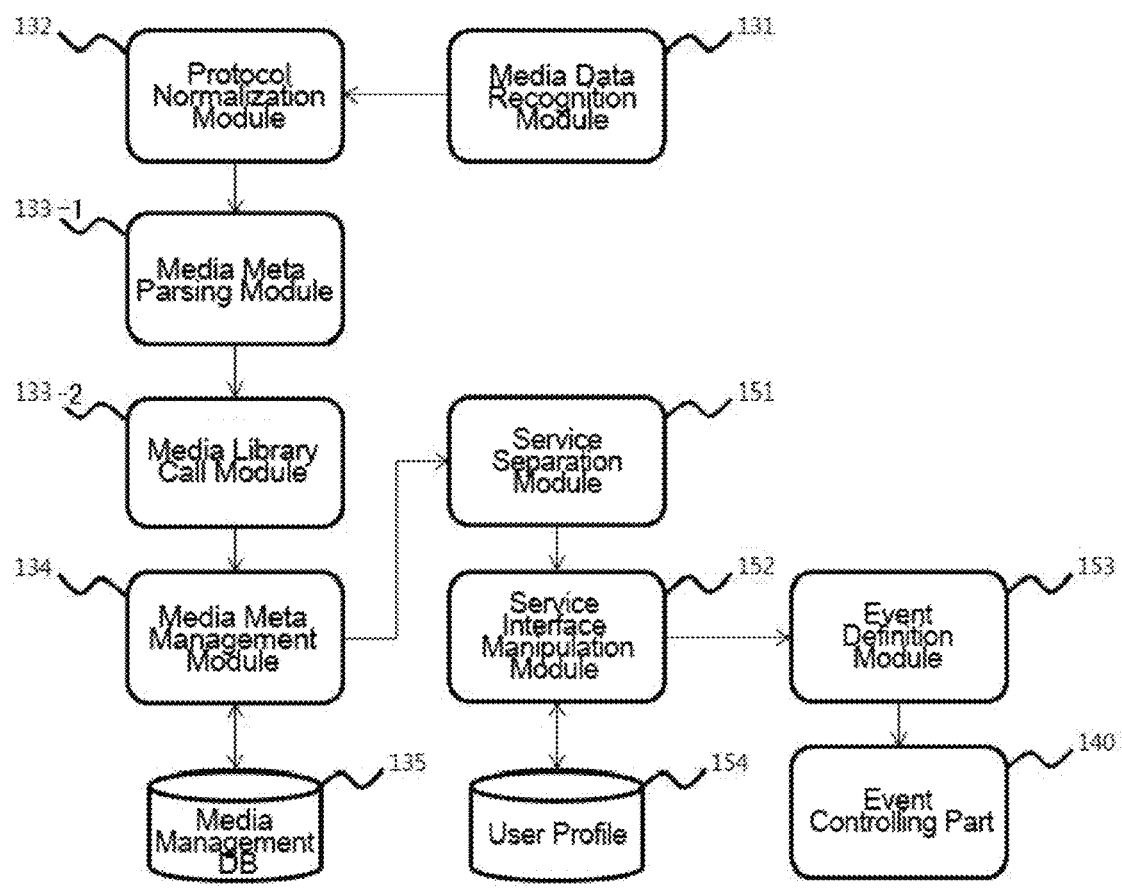
FIG. 5 is a block diagram specifically illustrating a media service interface and a media data receiving part in the smart device depicted in FIG. 1.
Figure 6:
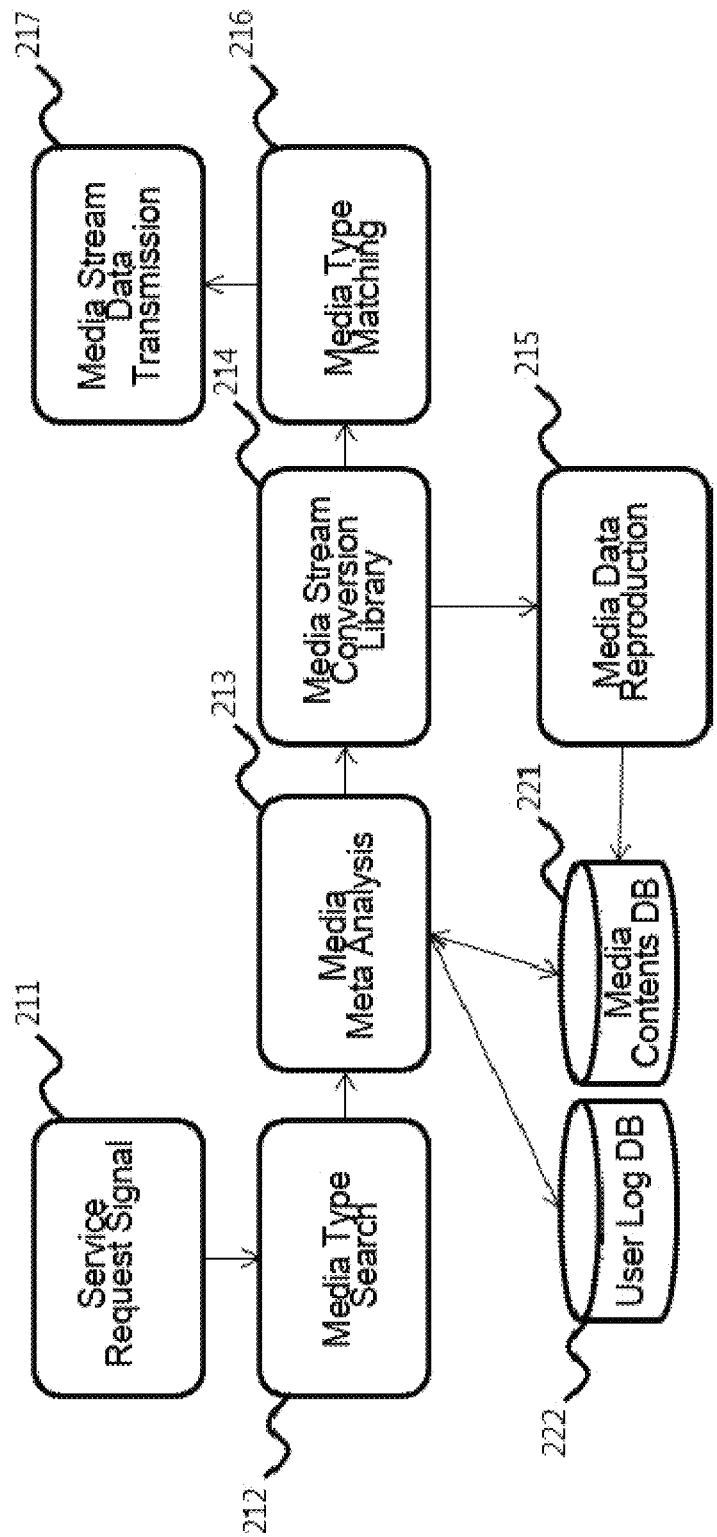
FIG. 6 is a block diagram specifically illustrating a module which automatically converts a media contents stream in accordance with a control signal and a media stream requested in the cloud media system depicted in FIG. 1.

To fulfill the aforementioned objectives, a data management and an automatic selection of a personal media device in a smart media cloud environment, which includes a module for converting media streaming data according to the present invention, include the method and function for synchronizing an individual smart device, a media play device connected via home network, and a cloud media system. In a smart media output device, UPnP and DLNA devices are automatically searched, and media metadata required for playing media contents are extracted to constitute a personal profile file. Furthermore, a media play device is automatically selected and connected to a cloud media system. For this purpose, a system construction and a method thereof are suggested, including a service agent part for automatically matching a smart phone and a media output device; a service requesting part for parsing a XML document of a device and requesting a media cloud computing service in accordance with a service signal; an event controlling part for controlling a service by synchronizing each smart device and media output device from the service requesting part; and a media data receiving part for receiving media data.

Exemplary embodiments are described more specifically with reference to the accompanying drawings. The same reference numerals denote the same elements throughout the drawings. In the illustration of invention, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The method for establishing and managing data, and for automatically selecting a personal media device, in a smart media cloud environment according to the present invention has a service structure connected via the Internet in a wired or wireless network environment. The internet 100 allows a convenient connection of individual multimedia services, and has a service environment for ubiquitous connection through a smart device. The smart device further provides an environment in which a quick access may be made to the connection of a media play device including UPnP and DLNA functions used in a multimedia environment. While there are problems, under this environment, as to preoccupation of devices, and as to analysis by service users of media play devices required for individual services, the present embodiment provides a service by means of a device selection and automatic connection which so converts a data stream as to meet a media play device. This structure is different from a prior art method which only provides a control structure required for service play. To pursue this structure, the present embodiment includes a cloud media system 200 for converting a media contents into a stream suitable for a play environment, a smart device 100 used for service use of individual users, and a media play device in a private network environment 300 including the UPnP and DLNA functions for outputting contents by receiving media stream signals. When the media contents whose output has been requested for play is not connected to the codec of a media play device included in the private network, a cloud media system converts it through a module 210 for converting a media contents stream. Furthermore, to prevent loss of an original data, the stability of files may be secured by comparing files in a checksum manner. The media stream provided for a service in a reproduced state is stored in a media contents DB and managed for other users confronting similar situations.

A smart device, which has a function of controlling UPnP and DLNA and outputs multimedia contents of a moving user, includes a service requesting part 110 for providing a media service with necessary information by requesting multimedia contents of individual users from a cloud media system; a service agent part 120 for suggesting information about a state of good connection by automatically receiving the information about media contents and media play devices; a media data receiving part 130 for reliably receiving a selected media data and extracting the information suitable for a service environment; an event controlling part 140 for outputting a signal which instantly controls the media play devices and the received media play information; and a media service interface 150 built on UX, in which the structures of a service interface vary according to the information, options, and the usage of users' services in a smart device.

The private network consisting of devices necessary for playing personal multimedia amounts to an environment where devices required for media play are connected via a wired or wireless network. This environment is a service environment where a media play device having UPnP function is intermingled with a media play device having DLNA function. Therefore, it has a function of expanding a variety of services through additional media protocol structures.

The service agent part, which connects media play devices suitable for media contents output of individual users according to the present invention, includes a service management module 121 for managing media contents output from a smart device; a service meta definition module 122 for parsing in a certain form meta information from media contents information in use; a device recognition module 123 for identifying and classifying signals received from the media play device; a device definition module 124 for constituting the device information output from UPnP and DLNA in the same form because such device information are different; a key match module 125 for suggesting the highest media play device information by analyzing the key value by elements necessary for play from the defined service meta and device meta information, and by arranging the device having a value above a certain form; a connectivity reinforcement module 126 for increasing the connectivity strength of a device by giving a service weight for maintaining the service of media play device and contents matched by the key; a selection recommendation module 127 for first recommending such connected media play device to users and then to interface so reorganized as to be suitable for the users' service structure; a signal reinforcement module 128 for strengthening a media stream signal in order to safely output the media service transmitted from the cloud media system to the recommended media play device; and an interface adjustment module call 129 for adjusting interfaces for safely controlling the structured media contents information, thereby suggesting automatically device connections.

The event controlling part, in which a smart device is used as a controlling instrument or media output device, includes an event control signal generating module 141 for identifying the event contents from an event definition module 153 in which a service control structure is pre-determined within the interface, and generating the event signal with respect to the event contents; a device matching information call module 142 for identifying the device matching information matched from the service agent part, and extracting the key value from the generated event control signal; an event key management module 145 for managing the event key and the matching key in a certain form; a matching key management module 146; an event DB 147 for storing and managing the keys for a certain period of time; and a device DB 148. It further includes a service control signal generating module 143 for generating a service control event signal, which controls the output of media contents and devices by the connected key value; and an event control signal transmission module 144 for safely transmitting the generated control signal to the cloud media system, so as to secure a safe transmission of the event of service.

The service requesting part for requesting the cloud media system for a service in the smart device, which has secured the service information of users, includes a network connectivity examination module 111 for testing a network environment in order to continuously maintain the connection of a network in a synchronization of media contents; a protocol definition module 112 for transmitting the requested signal to the cloud media system in order to request services through the connected network; a protocol requesting module 113 for requesting an information such as media play device information, service control signal, or user information, which are required to constitute a service request protocol; a device meta normalization module 114 for enciphering and normalizing each of the requested information to meet a protocol type; an event control signal normalization module 115 for synchronizing the service signal and control; an user certification module 116 for securing the certification information of users from a user profile 154 in order to protect the cloud media system and the safety of service; a protocol unification/compression module 117 for transmitting the aggregated information to the cloud media system quickly and reliably.

The media data receiving part for safely receiving the media contents information of the cloud media system requested at the smart device includes a media data recognition module 131 for recognizing the media stream information received from the cloud media system; a protocol normalization module 132 for outputting the recognized media data to a media play device or a smart device; a media meta parsing module 133-1 for extracting the information of media contents in order to manage the form of the received media stream data; a media library call module 133-2 for outputting the received media contents; a media meta management module 134 for unifying and managing the parsed media data and library; and a media management DB 135 for storing and managing these information in a certain form.

Once the analyzing process of the received information ends, a media service interface is made to automatically convert the interface display of the smart device. It includes a service separation module 151 for analyzing and separating the types of service contents from the parsed media meta information; a service interface manipulation module 152 for constituting the interface controlling the separated media contents; an event definition module 153 for connecting the media contents with the interface for the purpose of proper control according to the type of contents; and an event controlling part 140 for generating and controlling an event from an user's touching motion.

The cloud media system according to the embodiment of the invention has a structure suitable for a quick conversion of the resources of a server in accordance with an user's environment, and specifically has the feature of a module that converts media stream signal according to the output type of media play device connected to an individual network environment rather than a general structure, having the same service structure as that of a public/private cloud in other structural conditions. When a service request is received by an user from a smart device, a service request signal 211 for separating stream signal from the media control signal of the received information, and for extracting meta information; a media type search 212 for identifying and searching media contents from the extracted meta information with the standard of play information of the highest service device connected to individual networks; and a media meta analysis 213 for constituting the highest service meta by analyzing the output meta of the output media meta and the contents information retained by the cloud media system, are conducted, and finally the analyzed meta information is stored separately as a media contents DB 221 and an user log DB 222 managing the user information of the cloud media system. If there is no service information between the analyzed meta information and the contents information retained by the cloud media system, a media stream conversion library 214 for converting the media stream in accordance with an output device; a media data reproduction 215 for securing the safety of the original and duplicate of the converted media data, are conducted, and subsequently the reproduced media date is stored together in the media contents DB. Then, it proceeds to a media type matching 216 for matching into one and unifying, on the data of the converted media stream, the meta information of the service request signal and the converted meta information; and a media stream data transmission 217 for transmitting the unified media stream data to a smart device or a media play device connected via an individual private network.

Accordingly, a media contents suitable for an individual private network environment including a smart device may be transmitted from a cloud media system in a real-time manner, and the synchronization for securing the continuity of media service may be achieved by means of an automatic connection of the highest device.

Hereinafter, it is specifically explained a method for selecting an automated personal media device and managing data in a smart media cloud environment according to the invention.

First, matching is performed in accordance with each type of information in order to match the synchronization between a media output device and a smart device through the service agent part.

Then, a XML document of multimedia data included in the media output device and the smart device is parsed through the service requesting part, and a service of the smart media cloud is requested in accordance with a service signal.

After that, a multimedia service is controlled by synchronizing each of the media output device and the smart device according to the request through the event control part.

Furthermore, a media date, which is provided from the smart media cloud system, is received through the media data receiving part.

Therefore, a personal multimedia service may be provided by synchronization in a customized multimedia smart service environment using UPnP and DLNA, according to the invention.

The disclosure above is only to exemplify the technical scope of the invention, and a person having an ordinary skill in the pertinent art may come up with a variety of corrections, changes, and displacements within the essential scope of the invention. The drawings accompanied with this disclosure are not to limit, but to illustrate, the scope of the invention, and would not limit the scope of the invention. The extent of the exclusive right to the invention will be interpreted in reference to the accompanying patent claims, and will comprise any technical idea equivalent to the present invention.

This invention relates to a method for establishing a controlling environment and automatically connecting individual multimedia appliances including a media output device in a home network having UPnP and DLNA functions, and a technology of supporting the automatic conversion of media contents data suitable for service types. Therefore, the invention is applicable in, for example, automatic connection of devices and multiple device controlling, N-Screen service, data conversion service of business appliances, silver service, healthcare service, service industries for personalized multimedia.

DESCRIPTION OF REFERENCES

100: Smart Device
110: Service Requesting Part
120: Service Agent Part
121: Service Management Module
122: Service Meta Definition Module
123: Device Recognition Module
124: Device Definition Module
125: Key Match Module
126: Connectivity Reinforcement Module
127: Selection Recommendation Module
128: Signal Reinforcement Module
130: Media Data Receiving Part
140: Event Controlling Part
150: Media Service Interface
153: Event Definition Module
141: Event Control Signal Generating Module
142: Device Matching Information Call Module
145: Event Key Management Module
146: Matching Key Management Module
147: Event DB
148: Device DB
143: Service Control Signal Generating Module
144: Event Control Signal Transmission Module
111: Network Connectivity Examination Module
112: Protocol Definition Module
113: Protocol Request Module
114: Device Meta Normalization Module
115: Event Control Signal Normalization Module
154: User Profile
116: User Certification Module
117: Protocol Unification/Compression Module
131: Media Data Recognition Module
132: Protocol Normalization Module
133-1: Media Meta Parsing Module
133-2: Media Library Call Module
134: Media Meta Management Module
135: Media Management DB
151: Service Separation Module
152: Service Interface Manipulation Module
153: Event Definition Module
140: Event Controlling Part
200: Cloud Media System
210: Media Contents Stream Conversion Module
220: Media Contents DB
300: Private Network

What is claimed is:

1. A system for automatically selecting a personal media device and managing data under a smart media cloud environment, the system comprising:
a service agent part for performing matching suitable for each type of information to synchronize a smart device with a media output device;
a service requesting part for parsing a XML document of multimedia data included in said smart device and said media output device, and requesting a service of a media cloud system in accordance with a service signal;
an event controlling part for controlling multimedia services by synchronizing each of said media output device and said smart device in accordance with said service request; and
a media data receiving part for receiving media data provided from said smart media cloud system,
wherein a personal multimedia service is synchronized to be provided under a customized multimedia smart service environment using UPnP and DLNA,
wherein said service agent part comprises:
a key match module for analyzing the key value by elements necessary for play from the defined service meta and device meta information, arranging devices having a value above a certain form, and suggesting the information of the highest media play device;
a connectivity reinforcement module for increasing the connectivity of devices by giving a weight to service in order to maintain services of the media play device and the contents, which have been matched by said key; and
a selection recommendation module for recommending said media play device first to a user, and to an interface so rearranged as to be suitable for the user's service structure.

2. The system according to claim 1, wherein said service agent part further comprises:
a service management module for managing a media contents output from a smart device;
a service meta definition module for parsing meta data in a certain form from said media contents information;

a device recognition module for recognizing and categorizing signals received from said media play device;

a device definition module for constituting the difference between the information of devices output from UPnP and DLNA in a same form; and a signal reinforcement module for strengthening media stream signals to safely output the media service received from the cloud media system to said recommended media play device.

3. The system according to claim 1, wherein said event controlling part, which allows said smart device to be used as a controlling instrument or a media output apparatus, comprises:

an event control signal generating module for identifying an event content from the event definition module in which a service control structure is pre-determined within said user's interface, and generating the event signal with respect to the event content;

a device matching information call module for identifying the device matching information matched from said service agent part, and extracting a key value from the generated event control signal;

an event key management module for managing the event key and the matching key in a certain form;

a matching key management module for so controlling as to manage and store said matching key;

an event DB for storing and managing said keys for a certain period of time;

a device DB for storing a device information;

a service control signal generating module for generating a service control event signal, which controls the output of media contents and devices by means of said keys; and an event control signal transmission module for safely transmitting the generated control signal to the cloud media system.

4. The system according to claim 1, wherein said service requesting part for requesting a cloud media system for a service in a smart device with said user's service information retained, comprises:

a network connectivity examination module for testing a network environment to continuously maintain the connection of network in a synchronization of media contents;

a protocol definition module for transmitting a requesting signal to a cloud media system to request a service through said connected network;

a protocol requesting module for requesting a media play device information, a service control signal, and an user information, which are required to constitute a service requesting protocol;

a device meta normalization module for enciphering and normalizing each of the requested information in accordance with the type of protocol;

an event control signal normalization module for synchronizing service signals and controls;

an user certification module for securing user's certification information from an user profile to protect a cloud media system and the safety of service; and a protocol unification/compression module for performing a quick and reliable transmission to the cloud media system.

5. The system according to claim 1, wherein said media data receiving part for safely receiving the media contents information of a cloud media system requested at said smart device, comprises:

a media data recognition module for recognizing a media stream information received from a cloud media system;

a protocol normalization module for outputting said recognized media data to a media play device or smart device;

a media meta parsing module for extracting media contents information to manage the type of the received media stream data;

a media library call module for outputting the received media contents;

a media meta management module for unifying and managing the parsed media data and library; and a media management DB for storing and managing said information in a certain form.

6. The system according to claim 1, further comprising a media service interface for automatically converting an interface display of said smart device, wherein said media service interface comprises:

a service separation module for analyzing and separating the types of service contents in the parsed media meta information;

a service interface manipulation module for constituting interfaces controlling said separated service contents;

an event definition module for connecting media contents with interface for controlling in accordance with the type of said service contents; and an event controlling part for generating and controlling an event by an user's touching motion.

* * * * *